United States Patent [19]

Rorabaugh et al.

[11] Patent Number: 5,753,573
[45] Date of Patent: May 19, 1998

[54] SLURRY FOR MAKING FELTED CERAMIC INSULATION

[75] Inventors: Michael E. Rorabaugh, Seattle; Darryl F. Garrigus, Issaquah; Juris Verzemnieks, Browns Pt., all of Wash.

[73] Assignee: The Boeing Company, Seattle, Wash.

[21] Appl. No.: 462,378

[22] Filed: Jun. 5, 1995

Related U.S. Application Data

[62] Division of Ser. No. 40,217, Apr. 1, 1993, abandoned.

[51] Int. Cl.$^6$ .......................... C04B 35/00; C04B 35/80
[52] U.S. Cl. ....................... 501/94; 501/80; 501/95
[58] Field of Search ............................... 501/95, 80, 94

[56] References Cited

U.S. PATENT DOCUMENTS

| | | |
|---|---|---|
| 3,702,279 | 11/1972 | Ardary et al. . |
| 3,819,468 | 6/1974 | Sauder et al. . |
| 3,850,670 | 11/1974 | Gregory et al. . |
| 3,935,060 | 1/1976 | Blome et al. ............ 501/95 X |
| 4,041,199 | 8/1977 | Cartwright ............... 428/36 |
| 4,238,257 | 12/1980 | Remi et al. . |
| 4,318,996 | 3/1982 | Magdar ................. 501/84 |
| 4,452,832 | 6/1984 | Wrenn, Jr. et al. . |
| 4,632,944 | 12/1986 | Thompson . |
| 4,737,326 | 4/1988 | Wirth et al. . |
| 4,743,340 | 5/1988 | Wrenn, Jr. et al. . |
| 4,770,930 | 9/1988 | Wrenn, Jr. et al. . |
| 4,818,448 | 4/1989 | Wrenn, Jr. et al. . |
| 4,849,276 | 7/1989 | Bendig et al. . |
| 4,878,774 | 11/1989 | Andersson et al. . |
| 4,935,178 | 6/1990 | Esposito et al. . |
| 4,956,316 | 9/1990 | Sawyer ................. 501/95 X |
| 5,000,998 | 3/1991 | Bendig et al. ............ 428/117 |
| 5,009,822 | 4/1991 | Sacks et al. . |
| 5,021,369 | 6/1991 | Ackerman et al. . |
| 5,041,321 | 8/1991 | Bendig ................. 428/102 |
| 5,053,362 | 10/1991 | Chi et al. ............... 501/95 |
| 5,126,087 | 6/1992 | Lespade et al. . |
| 5,198,167 | 3/1993 | Ohta et al. . |
| 5,198,282 | 3/1993 | Baker et al. . |
| 5,310,592 | 5/1994 | Baker et al. ............. 428/117 |
| 5,322,725 | 6/1994 | Ackerman et al. ......... 428/137 |
| 5,369,064 | 11/1994 | Ohashi et al. ............ 501/95 |
| 5,385,873 | 1/1995 | MacNeill ............... 501/95 |

OTHER PUBLICATIONS

Yodas, *Aluminum Sol Preparation*, Ceramic Bull. vol. 54, No. 3, 1975, pp. 289–290.

*Primary Examiner*—Karl Group
*Attorney, Agent, or Firm*—John C. Hammar

[57] ABSTRACT

A slurry is molded from ceramic fibers and/or microparticles to form a soft felt mat which is impregnated with a sol prior to drying the mat. A catalyst for the sol is caused to diffuse into the mat by exposing the mat to the catalyst and subjecting the mat to a soak time during which the catalyst diffuses into the mat and causes the sol to gel. The sol-gel binder forms bonds so that the mat is dimensionally stabilized. The mat is dried to produce ceramic insulation.

9 Claims, 3 Drawing Sheets

1/16 INCH    16X MAGNIFICATION

1/16 INCH  16X MAGNIFICATION

1/16 INCH  16X MAGNIFICATION

SLURRY FOR MAKING FELTED CERAMIC INSULATION

The present application is a divisional application based upon U.S. Patent application 08/040,217, filed Apr. 1, 1993 now abandoned.

BACKGROUND OF THE INVENTION

This invention relates generally to a slurry for making ceramic insulation and, more particularly, a slurry for making rigidized refractory fibrous ceramic insulation for use in aerospace systems and a method for manufacturing such insulation.

Various components of aerospace systems may be exposed to elevated service temperatures or large temperature gradients which require that they be insulated. Ceramic insulation has therefore been applied to aircraft engine and engine exhaust components such as nose cones, firewalls and exhaust ducts to protect them from hot exhaust gases. Ceramic insulation has also been applied to the outer surface components of space vehicles as protection against the elevated temperatures and significant temperature gradients experienced upon takeoff and reentry.

Bendig, U.S. Pat. No. 5,041,321, describes a method of making fiberformed ceramic insulation by forming a slurry of ceramic fibers, molding the slurry to form a soft felt mat, drying the mat, and incrementally introducing a sol into the mat which is gelled to form a rigid mat. The incremental addition of the sol is accomplished through a multiple impregnation technique in which a small amount of sol is initially infiltrated into the mat, is gelled, and is cured to stabilize the mat dimensionally. Stabilizing allows handling and further processing of the mat. The mat is thereafter strengthened to its final form by successive additions sol which is gelled and cured. This technique cures the mat to a rigid shape without appreciable shrinking of the resultant structure. Density of the final product can be controlled with successive additions.

Despite its many advantages, the method disclosed in Bendig, U.S. Pat. No. 5,041,321, has reproduceability problems when the goal is to produce relatively thick insulation having uniform structure and density. To be practical, this thick insulation should be relatively free of cracks.

SUMMARY OF THE INVENTION

One aspect of the present invention, therefore, is a method using a novel slurry to make fiberformed ceramic insulation which is thicker and has consistently reproducible properties that could not consistently be made using previous methods. In another aspect, the invention is a method which more consistently produces crack-free insulation having more uniform structure and density and improved strength. The present method permits an increased forming rate, and maintains a uniform distribution of constituents in the slurry (and the insulation), although the constituents may have different densities.

Briefly, therefore, the invention is directed to a process for forming ceramic insulation. The steps of the process include forming a slurry of ceramic fibers and/or microparticles, molding the slurry to form a soft felt mat, impregnating the mat with a sol prior to drying the mat, gelling the sol to form sol-gel glass binder bonds so that the mat is dimensionally stabilized, and drying the mat to produce ceramic insulation.

The invention is also directed to a process including the steps of forming a slurry of ceramic fibers and/or microparticles, and a dispersant and/or a flocculant, molding the slurry to form a mat, impregnating the mat with a sol, gelling the sol to form a sol-gel binder, and drying the mat to produce ceramic insulation.

The invention is further directed to a process in which a slurry of ceramic fibers and/or microparticles is formed and molded to form a mat. After impregnating the mat with a sol, a catalyst for the sol infuses into the mat to initiate gelling to form a sol-gel binder. The infused mat, then, is dried to produce ceramic insulation.

The invention is still further directed to a process for forming a mat from a slurry of ceramic fibers and/or microparticles. The slurry is injected into a mold with sufficient back pressure to force a portion of the liquid out of the slurry through a porous surface and to leave a mat on the porous surface.

Another aspect of this invention is the ceramic insulation the foregoing processes produce.

A further aspect of the invention is a slurry used in the processes for forming ceramic insulation. The slurry includes ceramic fibers and/or microparticles, water, and, optionally, a dispersant, a flocculant or both.

Finally, the invention is directed to ceramic insulation having consistent microstructure and improved strength. The insulation includes ceramic fibers, microparticles or mixtures thereof and a sol-gel binder which is fully gelled through the entire thickness of the insulation.

DETAILED DESCRIPTION OF THE INVENTION

Figure 1:
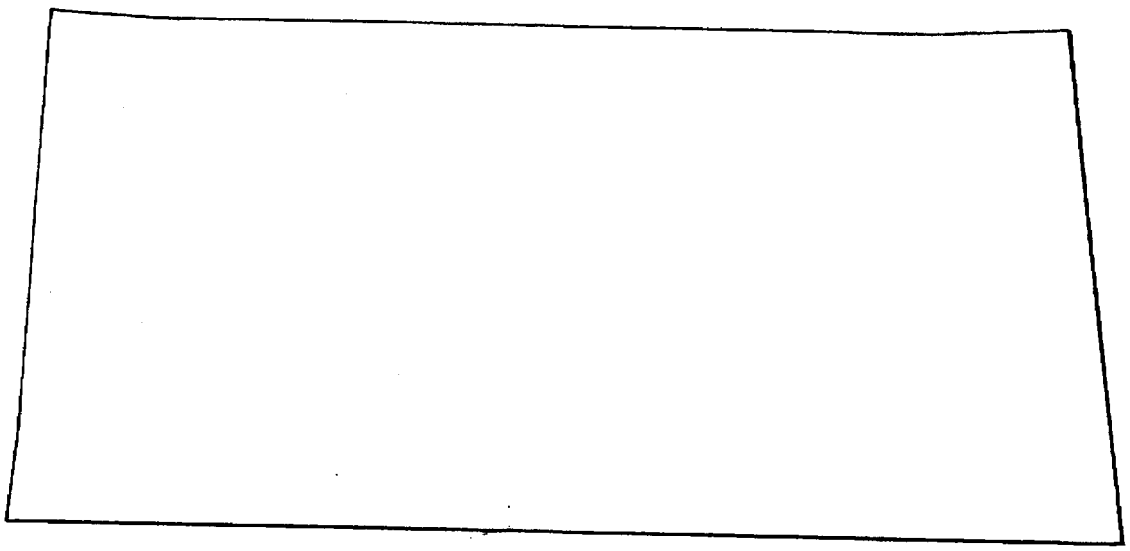
FIG. 1 is a photograph showing a cross section of the insulation of the invention.

The present invention provides a slurry for making improved ceramic insulation and improvements for sol-gel techniques for forming such insulation, in particular for sol-gel techniques of the type disclosed in U.S. Pat. No. 5,041,321, which is commonly assigned with this application and incorporated by reference.

The ceramic insulation of the present invention is formed from an aqueous slurry of ceramic fibers, microparticles or mixtures thereof. Microparticles as used herein refers to microballoons, diatoms, whiskers, and combinations thereof. Although fibers may be omitted to produce insulation consisting only of microparticles and sol-gel binder, the preferred insulation is fibrous ceramic insulation incorporating ceramic fibers or ceramic fibers in combination with microparticles. For simplicity we will refer only to fibers intending to include microparticles unless from the context it is clear that microparticles are excluded.

The preferred insulation is formed from a slurry of fibers such as aluminosilicate, alumina, mullite, zirconia, silicon nitride, other ceramic fibers or mixtures thereof may be used as desired. Suitable fibers include HS-95C and HSA fibers available from the Carborundum Corp. (Niagra Falls, N.Y.)

and NEXTEL 440 fibers available from 3M Company (St. Paul, Minn.). Different fiber mixtures may be used to tailor the insulative characteristics of the final product. For instance, insulation having distinct layers of alumina and aluminosilicate fibers is more effective at higher temperatures than certain other insulation. Different fiber mixtures may also be used to tailor the properties of the final product. For example, the combination of silica and alumina fibers provides low thermal conductivity with higher strength than can be achieved with silica fibers only.

Fibers are selected which have the geometry and packing density to impart the desired characteristics to the final product. Among the insulation's properties affected by the fibers' morphology and packing density are mechanical strength, density, thermal conductivity, and filtration characteristics. In general the use of longer fibers results in insulation of increased mechanical strength. The use of shorter fibers results in a slurry of higher solids content and, ultimately, insulation of higher density. For most applications the individual fibers have a diameter between about 0.5–10.0 micrometers, a length of less than about 6.4 millimeters, and an aspect ratio (length:diameter) between about 5:1 and 3000:1, although a small percentage of fibers outside these ranges is tolerable. The length of longer fibers within the slurry may be reduced by mechanical means, such as in a blender, if desired.

Incorporation of glass microballoons in the slurry can produce insulation of improved mechanical strength, lower dielectric constant, and more isotropic properties. Glass microballoons are available in many sizes and are generally hollow spheres made from various glass compositions with various wall thicknesses. Glass microballoons suitable for this purpose include ECCOSPHERES available from Emerson and Cuming, Inc. The incorporated glass microballoons are usually in the range of 5 to 200 micrometers in diameter, preferably in the range of 5 to 50 micrometers in diameter. They also generally have a crush strength in the range of 3.4 MPa to 31 MPa (500 to 4500 psi). The microballoons are impervious to sol, such that their density is not increased by absorption of sol. The mechanical compressive strength of insulation combining fibers with microballoons is increased because the microballoons support the fibers. Without microballoons, most of the fibers are oriented in the x-y plane (the z-axis being aligned with the thickness of the mat) because of the felting process. With microballoons, overall isotropy is improved in that the insulation can exhibit similar properties in the x-y, x-z and y-z planes. The degree of isotropy achieved increases with increased microballoon additions. The microballoons cause fibers to align in all planes. In addition, being spheres, the microballoons are similar in all planes.

To introduce fine, uniform porosity or voids throughout the mat, you can include fugitive microballoons, such as phenolic microballoons, in the slurry. The resulting insulation has a lower density without significantly or adversely reducing its strength. Fugitive microballoons can be removed from the insulation by heat treatment (i.e. "burn out") of the insulation above their decomposition temperature. Suitable phenolic microballoons for this purpose include UCAR Thermoset Microballoons available from Union Carbide.

You can also include diatoms in the slurry in place of or in addition to microballoons for purposes of strengthening the final structure. Diatoms are porous silica inner support structures of certain marine and fresh water algae having typical diameters between about 5 and 50 micrometers. Diatoms are not preferred for certain applications. Unlike microballoons, diatoms can absorb sol, leading to density increases and density discontinuities.

Another alternative is the use of whiskers, such as silicon carbide, silicon nitride, or alumina whiskers. Ceramic whiskers can increase the insulation's modulus and toughness. Whisker additions allow fabrication of lower density materials without loss of mechanical properties. The whiskers generally have an average aspect ratio of about 100:1 and diameters of about 0.1 to 1 micrometer. Microparticle enhanced fibrous ceramics incorporating microballoons, diatoms, and whiskers are disclosed in commonly assigned U.S. patent application 07/527,600, which is incorporated by reference.

The aqueous slurry of ceramic fibers and microparticles is mixed to provide a substantially uniform dispersion. The optimum concentration of the slurry will depend on the fibers and microparticles used and the relative amounts. The slurry will generally comprise up to about 10 wt % fibers and up to about 10 wt % microparticles with the remainder being water. The concentration must be low enough to provide a free-flowing slurry. Also, the concentration must be sufficient to expedite the forming process, trap microparticles and encourage fiber entanglement during forming to optimize z-axis strength. If whiskers are used, they typically constitute from about 5 to 50% of the total combined weight of the fibers and microparticles.

As part of the mixing process, dispersants are added to the slurry. Dispersants loosen agglomerations of fibers and other species in the slurry and thereby facilitate thorough mixing. Dispersants are especially useful for achieving complete dispersion of extremely small, agglomerated reinforcing whiskers and reduce the need for high energy mechanical mixing which may damage the fibers. The action of the dispersants involves imparting a charge to particle surfaces within the slurry such that repulsive forces exist between particles. Suitable chemical dispersants include ammonium and sodium polyelectrolytes such as Daxad 37LN10 (available from W.R. Grace Co., Lexington, Mass.), deflocculants from the Dispex family (Allied Colloids, Yorkshire, England) and Darvan C (RT Vanderbilt, Norwalk, Conn.), and various lignosulfonates. Dispersant is added in an amount which is effective for achieving the desired degree of dispersion. Although the amount of dispersant required varies depending on the selected dispersant and the characteristics of the slurry (including the nature and amount of fibers and microparticles in the slurry), typically on the order of 5–100 parts dispersant per million parts slurry by volume are required. For many applications the selected dispersant should be of such a nature that, when used in the required quantity, it does not leave substantial quantities of inorganic species on the particles which are not readily removable by thermal treatment.

The slurry of fibers, water, microparticles and dispersant is thoroughly mixed using a blender, a sonicator, or another appropriate mechanical mixer. The slurry may be gently mixed to minimize damage to the fibers or, alternatively, vigorously mixed to break the fibers and to form a more uniform distribution.

Flocculants may be added to the slurry to prevent the tangling of fibers into hard clumps which hinder uniform packing of the material upon part formation. Flocculant is preferably added to the slurry immediately after the slurry has been thoroughly dispersed such that the fibers and microparticles within the slurry do not have an opportunity to settle and segregate. Suitable flocculants include cationic and anionic polymers such as Daxad CP-2 (available from W.R. Grace Co., Lexington, Mass.), Magnifloc 1598 (American Cyanamid Co., Wayne, N.J.), and other products of the Magnifloc family such as 1883A, 592C, and 515C. As with the dispersant, it is usually necessary that the selected flocculant be of such a nature that, when used in the required quantity, it does not leave substantial quantities of inorganic species on the particles which are not readily removable by thermal treatment. Flocculant is added in an amount which is effective for achieving the desired degree of flocculation. Although the amount of flocculant required varies depending on the selected flocculant and the characteristics of the slurry, typically on the order of 5-100 parts flocculant per million parts slurry by volume are required. Flocculants place charged species on the surface of fibers and perhaps other particles within the slurry. Such charges help prevent entanglement of the fibers by providing weak attractive forces between the individual fibers, thereby helping to develop and maintain a loose structural network of fibers within the slurry. This loose structural network effectively traps microparticles and thereby minimizes segregation which can occur due to settling and floating. Without flocculants, denser materials may tend to separate out of the slurry mixture into less agitated locations in the mixing chamber, and microballoons may tend to float to the surface of the slurry.

It has also been discovered that shorter fibers can be used in forming fibrous ceramic insulation if flocculants are used to reduce settling and related filtering problems. Flocculants also reduce or eliminate the need for fiber-felting aids, as disclosed in U.S. Pat. No. 5,041,321, which were sometimes used with shorter fibers. Furthermore, flocculants counteract the potentially detrimental segregation and settling tendencies of a well dispersed system.

The combined effect of using dispersants followed by flocculants is to break up agglomerations of the system's components such that they can be thoroughly mixed to form a consistent slurry throughout and then to prevent settling and segregation of its components and thereby maintain the slurry in this condition. This process therefore facilitates the production of parts which have consistent microstructure in that their constituents are uniformly distributed throughout.

After flocculation, the slurry of fibers, microparticles, water, dispersant, and flocculant is formed into a soft felt mat having intersecting ceramic fibers, preferably by sucking the slurry through a filtered mold. The mold and associated tooling is, for example, an aluminum box having a screen on one side with a frame thereon which defines the shape of the part to be formed and means for creating a reduced pressure on the other side of the screen. As the water in the slurry is sucked through the screen, a felt mat is formed which conforms to the shape of the mold. Through selection of the mold, the felt mat can be formed in a variety of shapes, including those with irregular, curved surfaces and those with open interiors, such as hollow cylinders and frustums.

As an alternative to vacuum formation of the mat, positive pressure on the slurry side of the screen may be used to push water in the slurry through the screen, thus forming the mat against the screen. The use of positive pressure can increase the forming rate. Controlling the pressure throughout the forming period can also provide increased density through the thickness by controlling the pressure gradient at the surface of the mat facing the slurry. Larger pressure gradients produce higher density mats. As a further alternative, a vacuum and positive pressure may both be used, each on opposite sides of the screen. The mechanism and total pressure involved can be selected depending on the desired rate of production and insulation density.

After formation, the mat is impregnated with a sol which forms a ceramic sol-gel binder, i.e., a liquid solution which can be polymerized into a solid by thermal or chemical means. The sol is preferably an alumina precursor, but other precursors for sol-gel binders such as sol precursors for silica, mullite, yttria, zirconia, aluminoborosilicate, or for other of the sol-gels known to those skilled in the art may be used. Yoldas, *Alumina Sol Preparation*, Ceramic Bulletin, Vol. 54, No. 3, 1975, p. 289-90, describes certain conventional techniques for preparing an alumina sol-gel glass binder.

U.S. Pat. No. 5,041,321 discloses drying the mat after its formation and then introducing sol into the mat. It has been discovered, however, that certain advantages are attained by introducing binder into the mat, that is, infiltrating sol into the mat and gelling the sol, before the mat is dried. In particular, strengthening the mat with sol-gel binder prior to drying improves the insulation's structural integrity. Accordingly, a sol may be drawn into the mat in a vacuum impregnation operation similar to the manner in which water is drawn through the part during forming. Sol impregnation can alternatively be accomplished by positive pressure, combination positive pressure/vacuum mechanisms, spraying, or wicking. The binder displaces water in the system and ensures that the fibers and other components are bound together during drying, thus preventing deformation of the part and disruption to its microstructure. The introduction of binder prior to drying results in a more stable microstructure having reduced average void size as compared to prior procedures. In the absence of binder, deformation can occur during drying due to the loss of capillary forces and fluffing of the mat's fibrous and microparticle components.

Following the first sol infiltration, gelling the sol to form the binder is initiated by placing the part in an atmosphere containing a catalyst for gelling of the binder. The preferred atmosphere is flowing, concentrated anhydrous ammonia gas. Ammonia dissolves in sol such as water-based alumina sol and catalyzes complete gelling, that is, conversion of the sol to a gel which is not fluid or viscous, but which is elastic and handleable. In general, the part is exposed to flowing, concentrated ammonia for on the order of about 0.5 to 4 minutes per centimeter of part thickness, preferably for about 0.5 to 3 minutes per centimeter of part thickness, and, more preferably for about 0.5 to 2 minutes per centimeter of part thickness or the equivalent thereof. Significantly greater exposure to ammonia, such as exposing the part to concentrated ammonia for 12 minutes or more per centimeter of part thickness, may result in overexposure to ammonia and damage as described below. In addition, the optimum exposure time per centimeter of part thickness decreases as the thickness of the part increases to avoid overexposure to ammonia. Thickness in this context refers to the smallest effective dimension of the part, which for most shapes formed by this process is the dimension of the part which is perpendicular to the plane defined by the screen used during forming. For parts of irregular shape and of varying thickness, the details of the ammonia exposure are determined by the details of the part's configuration. The selected ammonia exposure time is sufficient to ensure that enough ammonia is supplied to gel the thickest cross section of the part, but not such that thinner sections are overexposed to ammonia.

The part is exposed to ammonia by placement in a chamber containing circulating ammonia. A suitable chamber is a non-flow-through bag, enclosure, or similar device having an inlet to which ammonia gas is constantly being supplied to replace ammonia diffusing into the part. Another suitable chamber is a flow-through system constantly supplied with concentrated flowing ammonia. Because this latter system maintains a high concentration of ammonia at the part's surface, the required exposure time is slightly less than in the non-flow-through system.

After the part is exposed to ammonia, it is subjected to an ammonia soak time, that is, a period of time to allow for ammonia to diffuse to the center of the part. During this period, the sol-to-gel transition, that is, gelling, is completed. Some gelling occurs during the ammonia exposure period, but the majority of gelling occurs during this subsequent ammonia soak time. As the sol-to-gel transition is completed, the sol-gel binder forms bonds at the intersections of the ceramic fibers so that the mat is dimensionally stabilized. Without this soak time, a risk exists that gelation will not be complete prior to subsequent drying and that ungelled sol will migrate from the center of the part during such drying, resulting in a weakened center. The length of the ammonia soak time is greater than about one-half hour per centimeter of part thickness, preferably over 1.5 hours per centimeter of part thickness, and more preferably about 3 hours per centimeter of part thickness. The optimum soak time per centimeter of part thickness for a given part is dependent upon the thickness of the part and initial ammonia exposure conditions, and in general, increases as the thickness of the part increases. This ammonia soak is preferably carried out in a sealed bag at room temperature. For particular embodiments of the invention, preferred ammonia exposure and soak times are presented in Table 1.

TABLE 1

| Part Thickness (cm) | Maximum Flow Duration (minutes) | Minimum Soak Time (hours) |
| --- | --- | --- |
| 1.25 | 2 | 2 |
| 2.5 | 4 | 5 |
| 5 | 8 | 14 |
| 7.5 | 12 | 24 |

Exposure of the part to ammonia and the ammonia soak time in this process occur at relatively low pressure, that is, about atmospheric pressure or slightly above, such that the ammonia is allowed to freely diffuse into the part. It has been discovered that allowing sufficient time for diffusion ensures complete gelling of the sol throughout the part without overexposure to ammonia. Certain prior art methods dry the part immediately after ammonia exposure or rely on vacuum or pressure infiltration of catalyst to gel the sol. Forcing ammonia into the part using a pressure difference to create flow is avoided in this invention because such a process will displace sol from the mat.

Controlling ammonia exposure and soak time helps prevent the formation of defects. If too much ammonia is dissolved in the sol, cracks and voids result from volume expansion of ammonia-rich sol.

Further problems stem from processing without a catalyst or from not allowing sufficient time for the catalyst to diffuse throughout the part. In such cases the sol does not completely gel. Binder will migrate to surfaces where water and ammonia are evaporating, during drying, and will leave internal regions of the part binder-deficient. Localized binder deficiency can result in weakened regions of the insulation and deformation due to fluffing during drying. Migration of binder to the part's surface can also produce a dense, binder-rich surface which hinders subsequent infiltration cycles or may require that the binder-rich region be removed by machining prior to subsequent infiltration cycles. The gelling process of this invention prevents migration of the binder during drying. This homogeneously distributed gel forms bonds at the intersections of the ceramic fibers during drying so that the mat is dimensionally stabilized. This process promotes the production of insulation which is fully gelled, crack-free, of uniform density, and of consistent microstructure. The uniformity and consistency of this insulation results in improvement of its overall strength in that there are no localized regions significantly weaker relative to the insulation as a whole.

As an alternative to anhydrous ammonia gas, ammonium hydroxide solution can be used to catalyze gelling. In particular, $NH_4OH$ can diffuse into the part by submerging the part in a 0.5 to 5 wt % solution for a time sufficient for the entire part to achieve the desired ammonia concentration, about 1–20 hours per 2.5 centimeters of part thickness. This submersion achieves the exposure to and diffusion of catalyst achieved by the combined exposure and soak times previously described. Submersion in ammonium hydroxide solution allows the maximum catalyst concentration in the part to be specifically limited by control of the solution concentration. In contrast, there is no such control when using concentrated ammonia gas because a high ammonia concentration at the part's surface results initially, though it diminishes after the part is removed from the ammonia-rich atmosphere and as the ammonia diffuses into the part. Submersion in ammonium hydroxide solution may therefore be advantageous for production of, for example, irregularly shaped parts having disparate thicknesses where the ammonia gas exposure time required for processing thicker sections would result in overexposure of thinner sections. Other sols may be gelled by other catalysts as will be recognized by those skilled in the art.

In a further alternative to the processes described above in which the mat is exposed to the catalyst after sol infiltration, it has been discovered that the catalyst may be added to the sol prior to infiltration. For example, ammonia may be bubbled into the sol in a high speed mixer until the mixture reaches a pH of about 5.5. The mat is then impregnated with sol and the catalyst simultaneously. The resulting sol is initially fluid but it completely gels in about 3 hours. A similar result can be achieved by incorporating hexamethylenetetramine (HMT), which releases ammonia when heated, into the slurry. Upon heating, the HMT will catalyze gelling. These alternative methods may be preferred in certain applications where the thickness or configuration of the part would otherwise require lengthy ammonia flow durations and soak times.

After gelling is complete, the soft felt mat, usually without the mold, is dried and cured in a combined operation, herein referred to as drying, wherein residual moisture is removed from the part and the gel is cured, that is, caused to harden to its final, rigid structure. The mat is dried after gelling, rather than before, so that the problems described above with respect to deformation, dimensional stability, and binder migration are avoided.

Drying is accomplished by heating to a temperature between about 66° C. (150° F.) and 100° C. (212° F.) for several hours, preferably about 4 hours, holding at that temperature until the physically bound water is evaporated, and slowly increasing the temperature to above about 316° C. (600° F.), where it is held for several hours, preferably at least about 4 hours, and subsequently reducing the temperature to ambient temperature. Drying removes all water from the mat and stabilizes the gel. Drying time can range from minutes to days depending on the initial water content of the mat. Holding the insulation for a period at or above about 316° C. (600° F.) ensures that water which is chemically bound within the gel is removed and that the binder is stabilized with regard to water damage. The required drying time will depend on the size, especially the thickness, and shape of the mat. Parts which are several centimeters thick should be held at or above about 316° C. (600° F.) for 4 hours or longer. If chemically bound water is not completely removed, water may dissolve uncured sol upon re-infiltration, as described below.

After drying, the part may again be subjected to sol infiltration, ammonia exposure, ammonia soak, and drying. Additional cycles increase the mechanical strength of the insulation, but also increase its density, as the additional binder fills voids. Optimization of these properties therefore dictates the number of infiltration cycles. Typical operation involves 2–5 total infiltration cycles. Three total cycles may result in, for example, insulation having a density of 0.35 g/cm$^3$ (22 lb/ft$^3$). Fibrous insulation having a density of 0.35 g/cm$^3$ would be expected to be approximately 90% void and 10% binder, fiber and microparticles, by volume.

The practice of repeated sol infiltrations is facilitated by this invention's process of controlled ammonia exposure, as opposed to vacuum or pressure infiltration. A part which has undergone sol infiltration, gelling, curing and re-infiltration steps does not have an abundance of passages for ammonia to flow through. Forcing ammonia through the part by vacuum or pressure infiltration, therefore, presents the risk that sol will be displaced as ammonia is forced into the part. Allowing the ammonia to diffuse into the part, and avoiding any significant pressure differential, in contrast, ensures that displacement of sol by ammonia in this manner is avoided, since only an amount of ammonia which can readily infiltrate the part is actually introduced.

As a final operation the insulation may optionally be subjected to a high-temperature heat treatment. Such heat treatment serves to further stabilize the insulation and to prevent shrinkage during subsequent high-temperature service. Stabilization is brought about by continued structural development of the sol gel binder. The preferred heat treatment occurs at a temperature at least about 55° C. (100° F.) above the intended service temperature and for a period which results in suitable stability of the part. For example, if insulation manufactured according to this invention is expected to perform in service temperatures of about 816° C. (1500° F.), it is preferable that it undergo heat treatment at a temperature at least about 871° C. (1600° F.). High-temperature heat treatments can increase the strength of the insulation and may be performed on materials intended for lower temperature applications.

By forming insulation in accordance with the procedures of this invention, fibrous ceramic insulation is produced which is fully gelled, of uniform density, and free from process-induced internal damage such as cracks, delamination, or large voids. These parts also have consistent microstructure in that their constituents are uniformly distributed throughout. Because the insulation is of consistent structure and fully gelled through its entire thickness, it is uniformly stronger throughout and does not comprise a central region which is inherently weaker than surface regions. Tensile tests on this insulation have shown it to have a z-axis tensile strength of at least about 0.17, 0.21 and 0.24 MPa (25, 30 and 35 psi). Furthermore, these properties are produced in relatively thick parts, even greater than 5 and 7 centimeters thick.

Figure 2:
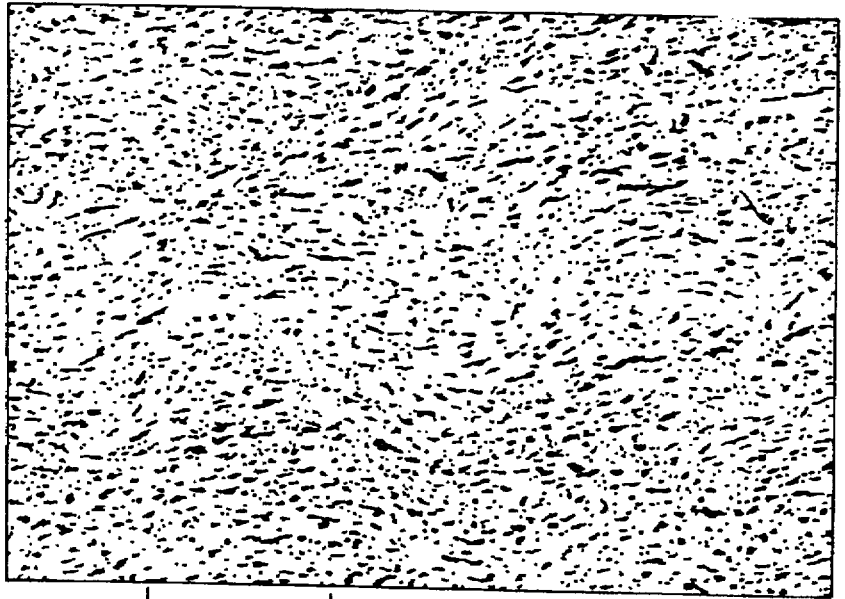
FIG. 2 is a photomicrograph showing a cross section of the insulation of the present invention.
Figure 3:
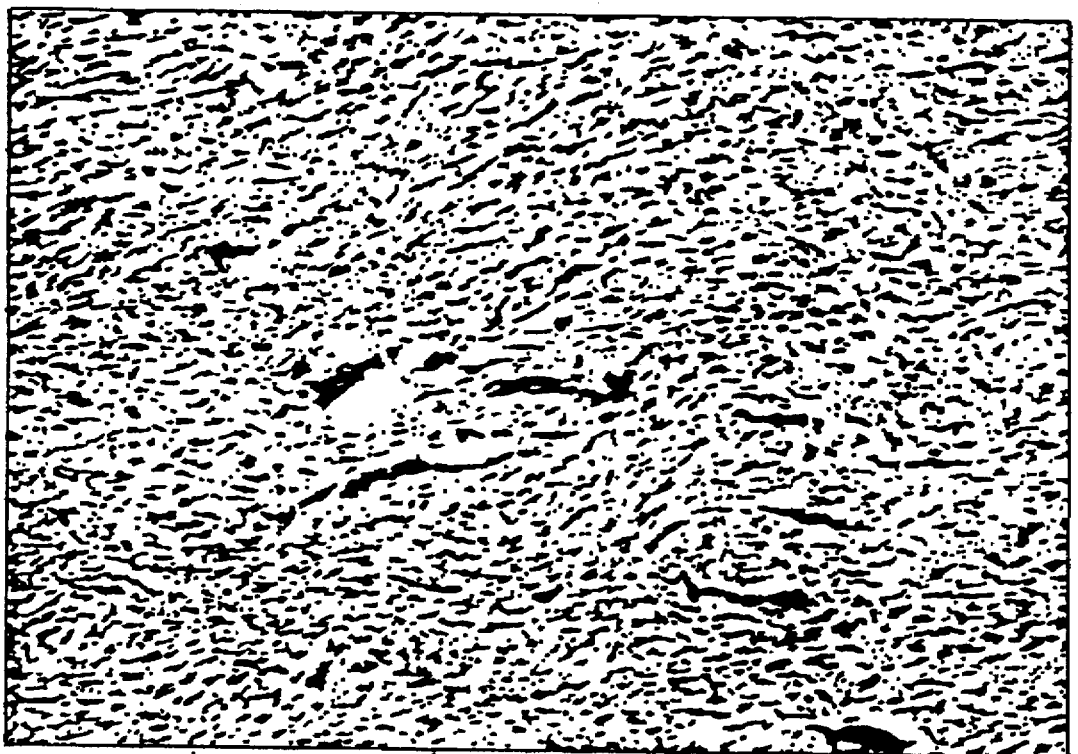
FIG. 3 is a photomicrograph showing a cross section of ceramic insulation having a defect.
Figure 4:
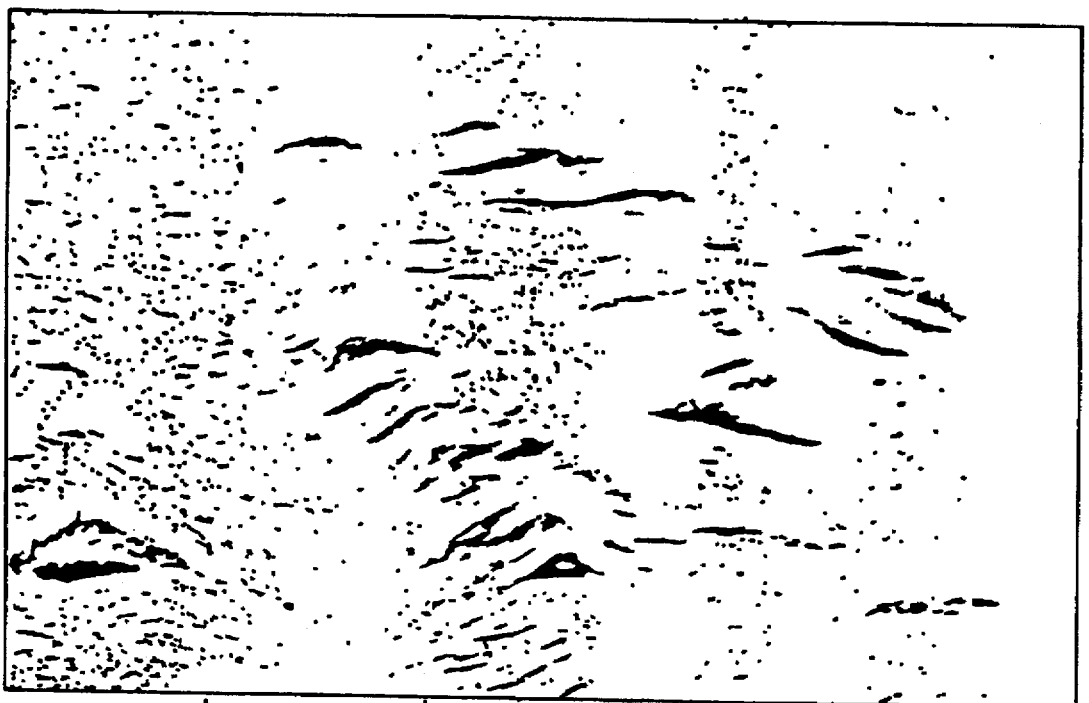
FIG. 4 is a photomicrograph showing a cross section of insulation having another defect.
Figure 5:
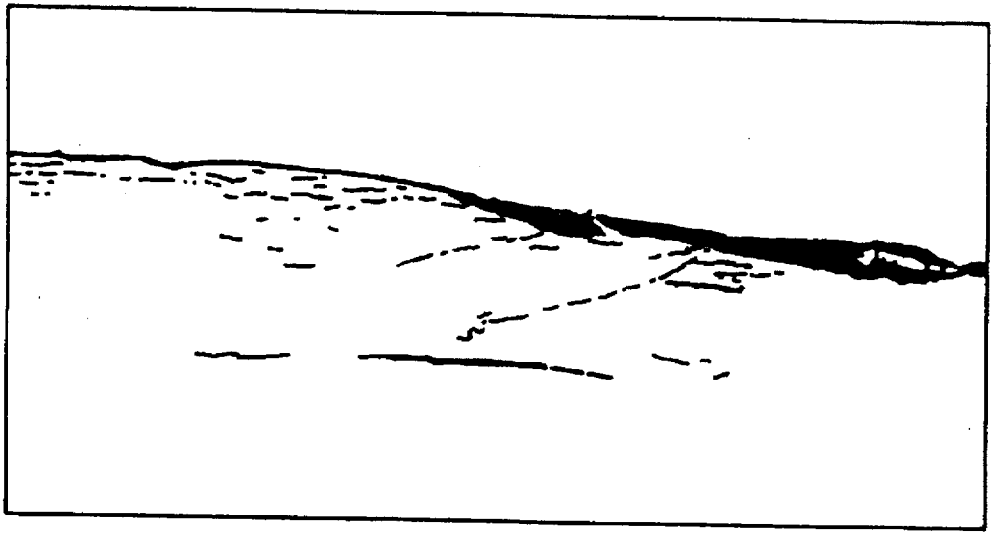
FIG. 5 is a photograph showing a cross section of insulation having yet another defect.

The process of this invention produced the pieces of insulation shown in cross-section in FIGS. 1 and 2. They are free from internal damage. The insulation of FIG. 1 did not incorporate microballoons and was prepared similarly in all significant respects to the procedure of Example 1 described below. The insulation of FIG. 2 was prepared similarly in all significant respects to the procedure of Example 2. Fugitive microballoons were used to induce the exhibited porosity. The insulation of FIG. 3 was prepared from the same mat as the insulation of FIG. 2. That particular mat was cut into sections prior to sol infiltration. The section corresponding to the insulation of FIG. 2 underwent sol infiltration and gelling prior to drying whereas the section corresponding to the insulation of FIG. 3 did not. The pieces of insulation shown in FIGS. 4 and 5, which exhibit cracking and delamination, neither underwent ammoniation and gelation prior to drying nor were they produced according to the ammoniation and ammonia soak time specifications of this invention.

The fundamentals of this invention can be practiced in connection with a variety of different methods for forming ceramic insulation. In particular, these fundamentals can be practiced in connection with the method as is disclosed in U.S. Pat. No. 5,041,321 wherein a plurality of different slurries containing different ceramic fibers are formed and molded in succession to form a single felt mat having interlocking layers of fibers. It is also possible to strengthen insulation made by this method by incorporating glass coating or refractory stitching as disclosed in that patent. This method can be used for forming fibrous ceramic insulation with a honeycomb core, as described in U.S. Pat. Nos. 4,849,276 and 5,000,998; insulation including a water-wall passive cooling system, as described in U.S. patent application No. 5,322,725; insulation including infused ablative material, as described in U.S. patent application No. 5,310,592; or insulation including reinforcement cloth bound within the mat by sol-gel glass bonds, as described in U.S. patent application No. 07/537,339. Each patent or application is incorporated by reference.

The following examples further illustrate the method of the invention.

EXAMPLE 1

Carborundum HS-95C fibers (5420 g) were added to water (1084 kg) to form a slurry of about 0.5% solids. The slurry was mixed in a tank using a propeller type mixer. A portion of the slurry was sucked into a tool having a flat porous surface by vacuum suction (640 mm Hg). The suction was terminated after about 4.5 minutes, which was about 1 minute after the water in the slurry was no longer readily visible, leaving a flat mat about 7.3 centimeters thick. An amount of alumina sol was poured onto the mat such that the sol's volume was 1.5 times the mat's volume. Suction behind the mat was reinstituted and maintained at about 660 mm Hg to assist infiltration of the sol into the mat. The suction was terminated about 1 minute after the sol was no longer readily visible on the mat surface. The mat was then exposed to ammonia for 20 minutes (slightly less than 3 minutes per centimeter of part thickness) in a sealed nylon bag with a small inlet tube connected to an ammonia gas source. Ammonia gas was flowed into the bag at a flow rate designed to keep the bag fully inflated and at a pressure slightly greater than 1 atmosphere. The mat was allowed an ammonia soak time and gelation period of about 24 hours in a sealed bag at room temperature. The mat was dried by heating to about 88° C. (190° F.), holding at that temperature for about 60 hours, further heating to about 371° C. (700° F.), holding at that temperature for several hours, and then was cooled to room temperature. The sol impregnation, ammoniation, ammoniation soak, and drying operations were repeated three times. The resulting part had a z-axis tensile strength of 0.24 MPa (35 psi) and a density of 0.35 g/cm$^3$ (22 lb/ft$^3$). The z-axis is parallel to the part's thickness, that is, perpendicular to the plane of the screen during part formation. We used a 2.5×2.5×5 centimeter (i.e., a 1×1×2 inch) part held in an Instron tensile tester equipped with pins to allow for alignment and to prevent bending of the part during testing.

EXAMPLE 2

Silicon carbide whiskers (500 grams) were dispersed in a blender in water (10 kg) to which Daxad 37LN10 dispersant (about 2 grams of 10% solids in an aqueous solution) available from W.R. Grace Co. was added. The whiskers, dispersant and water were mixed with a slurry of water (73 kg) and Carborundum HS-95C fibers (500 grams) using a propeller mixer. Phenolic microballoons (250 grams) and Daxad CP-2 flocculant (6 grams of 10% solids in an aqueous solution) available from W.R. Grace Co. were then added to this mixture. The slurry was then stirred and poured over a flat porous surface. The water in the slurry was pulled through the porous surface by a vacuum suction of about 660 mm Hg. The suction was terminated about 10 seconds after water on the mat was no longer visible, leaving a flat mat about 5 centimeters thick. Alumina sol was poured onto the mat in amount which equalled about 1.5 times the mat's volume. The suction behind the mat was reinstituted and maintained at about 660 mm Hg to assist infiltration of the sol into the mat. The mat was then exposed to flowing ammonia for 10 minutes (approximately 2 minutes per centimeter of part thickness) in a flow through bag. The mat then soaked in ammonia for about 24 hours in a sealed bag at room temperature. The mat was then dried by heating to about 88° C. (190° F.), holding at that temperature for about 50 hours, and then further heating to about 371° C. (700° F.), and holding at that temperature for several hours. Finally, the mat was cooled to room temperature. The sol impregnation, ammoniation, ammonia soak and drying operations were repeated twice. The part was then subjected to a thermal treatment (about 538° C. (1000° F.) for about 1 hour) to volatilize and remove the phenolic microballoons. The resulting part was determined by testing as with Example 1 to have a z-axis tensile strength of 0.45 MPa (65 psi) at 0.29 g/cm$^3$ (18 lb/ft$^3$).

EXAMPLE 3

Seven pieces of insulation were produced from the slurry of Example 1 and by a process similar in all significant respects to the process of Example 1. Each sample was cut into 3 specimens and tested using an Instron tensile tester equipped with pins to allow for alignment, and to prevent bending, of the part during testing. Each specimen measured 2.5 centimeter along the x and y axes. Specimens 1–7 measured 2.5 centimeter along the z-axis, specimens 8–14 measured 3.8 centimeters along the z-axis, and specimens 16–21 measured 5.0 inches along the z-axis. The z-axis tensile strengths determined by these tests are presented in Table 2 and demonstrate the improved strength of the insulation of the invention.

TABLE 2

| Specimen number | Tensile Strength | | Specimen number | Tensile Strength | |
|---|---|---|---|---|---|
| | psi | MPa | | psi | MPa |
| 1 | 43.6 | 0.301 | 11 | 37.6 | 0.259 |
| 2 | 42.6 | 0.294 | 12 | 38.3 | 0.264 |
| 3 | 38.9 | 0.268 | 13 | 36.1 | 0.249 |
| 4 | 38.6 | 0.266 | 14 | 38.8 | 0.267 |
| 5 | 39.5 | 0.272 | 15 | 30.3 | 0.209 |
| 6 | 38.5 | 0.265 | 16 | 36.1 | 0.249 |
| 7 | 40.5 | 0.279 | 17 | 32.9 | 0.229 |
| 8 | 38.4 | 0.265 | 18 | 33.1 | 0.228 |
| 9 | 42.6 | 0.294 | 19 | 32.2 | 0.222 |
| 10 | 38.8 | 0.267 | 20 | 29.6 | 0.204 |
| | | | 21 | 32.4 | 0.223 |

EXAMPLE 4

Two pieces of insulation were produced as set forth in Example 1 except that the solids content of the slurry was about 0.125%. Each piece was cut into 5 specimens and one specimen of each part was heat-treated to 649° C. The parts produced at normal processing temperatures (without heat-treatment) were weaker than those identified in Examples 1 and 3, probably due to the low slurry concentration. Heat treatment, however, produced parts having significantly increased strength. The results are presented in Table 3 (specimen 5 of each part was heat-treated to 649° C. specimens 1–4 were subjected only to normal processing temperatures).

TABLE 3

| Part 1 | | | Part 2 | | |
|---|---|---|---|---|---|
| Specimen number | psi | MPa | Specimen number | psi | MPa |
| 1 | 29.8 | 0.205 | 1 | 30.5 | 0.210 |
| 2 | 29.2 | 0.201 | 2 | 29.5 | 0.203 |
| 3 | 30.6 | 0.211 | 3 | 31.8 | 0.219 |
| 4 | 28.4 | 0.196 | 4 | 28.9 | 0.199 |
| 5 | 35.4 | 0.244 | 5 | 37.0 | 0.255 |
| Stength Increase | 20% | | | 23% | |

Although specific examples of the present invention and its application are set forth it is not intended that they are exhaustive or limiting of the invention. These illustrations and explanations are intended to acquaint others skilled in the art with the invention, its principles, and its practical application, so that others skilled in the art may adapt and apply the invention in its numerous forms, as may be best suited to the requirements of a particular use.

We claim:

1. A slurry having solids carried in a fluid for use in a process for forming ceramic insulation by separating the solids from the fluid in a felting operation to form a mat, comprising:
   (a) a carrier fluid;
   (b) optionally, ceramic fibers sufficient for adjusting the geometry and packing density of the ceramic insulation to control the mechanical strength, density, thermal conductivity, and filtration characteristics;
   (c) an amount of ceramic microparticles being either solid or hollow microspheres sufficient to increase the mechanical compressive strength of the ceramic insulation and to improve the overall isotropy of the ceramic insulation, (d) optionally, an effective amount of fugitive microballoons to introduce fine, uniform porosity or voids in the ceramic insulation;

(e) optionally, as part of the ceramic microparticles, an effective amount of ceramic whiskers sufficient to increase the modulus and toughness of the ceramic insulation;

(f) optionally, as part of the ceramic microparticles, an effective amount of diatoms in place of or in addition to the ceramic microparticles for strengthening the ceramic insulation;

(g) a dispersant to loosen agglomerations of the ceramic components being between about 5–100 parts dispersant per million parts slurry by volume; and (h) a flocculant to reduce settling and related filtering problems of the slurry being between about 5–100 parts flocculant per million parts slurry by volume.

wherein the dispersant and the flocculant function together to provide a thoroughly mixed slurry having a consistent composition throughout to facilitate production of ceramic insulation that has consistent microstructure.

2. The slurry of claim 1 having ceramic fibers, the fibers being aluminosilicate, alumina, mullite, zirconia, silicon nitride, or mixtures thereof having aspect ratios of about 5:1 to 3000:1 (length:diameter) and lengths less than about 6.4 mm and wherein the carrier fluid is water.

3. The slurry of claim 1 wherein the ceramic microparticles include glass microballoons about 5–200 μm in diameter having a crush strength of about 3.4–31 MPa (500–4500 psi).

4. The slurry of claim 3 wherein the glass microballoons are free of pores.

5. The slurry of claim 4 comprising an amount of ceramic fibers, the fibers having aspect ratios of about 5:1 to 3000:1 (length:diameter) and lengths less than about 6.4 mm.

6. The slurry of claim 5 wherein the dispersant is ammonium and sodium poly electrolytes, deflocculants, lignosulfonates, or mixtures thereof and wherein the flocculant is a cationic or anionic polymer.

7. The slurry of claim 1 comprising an amount of whiskers, wherein the whiskers are silicon carbide, silicon nitride, or alumina, the whiskers having an average aspect ratio of about 1:100 (length:diameter) and diameters of about 0.1–1.0 μm.

8. A slurry useful for forming a ceramic insulation by separating solids in the slurry from a carrier fluid, the slurry comprising:

ceramic fibers selected from the group consisting of aluminosilicate, alumina, mullite, zirconia, silicon nitride and mixtures thereof, the ceramic fibers having an aspect ratio of about 1:5 to 1:3000 (diameter:length) and a length of less than about 6.4 mm and ceramic whiskers being silicon carbide, silicon nitride or alumina, the ceramic whiskers having an average aspect ratio of about 1:100 (length:diameter) and diameters of about 0.1–1.0 μm dispersed in water as the carrier fluid with
a dispersant and
a flocculant wherein the dispersant and the flocculant function together to provide a thoroughly mixed slurry having a consistent composition throughout to facilitate production of ceramic insulation that has consistent microstructure, the dispersant and flocculant each being present in a concentration of about 5–100 ppm by volume, and optionally, an effective amount of glass microballoons to improve overall isotropy of the ceramic insulation, and optionally, an effective amount of fugitive microballoons sufficient to introduce fine, uniform porosity or voids to the ceramic insulation, and optionally, an effective amount of diatoms in place of or in addition to the ceramic microparticles for strengthening the ceramic insulation wherein the ceramic fibers comprise an amount up to about 10 wt % of the slurry, the glass microballoons, if present, comprise about 10 wt % of the slurry, and the ceramic whiskers are about 5–50% of the total combined weight of the ceramic fibers and glass microballoons.

9. The slurry of claim 8 wherein the ceramic fibers and the ceramic whiskers are present in about equal weights and glass microballoons are absent.

* * * * *